(12) United States Patent  
Yamazaki et al.

(10) Patent No.: US 8,521,360 B2  
(45) Date of Patent: Aug. 27, 2013

(54) ACCELERATOR PEDAL APPARATUS

(75) Inventors: Shigeru Yamazaki, Kanagawa (JP); Meguru Kashiyama, Kanagawa (JP); Masato Kumamoto, Kanagawa (JP); Tsuyoshi Oosawa, Kanagawa (JP); Hiromutsu Touhachi, Kanagawa (JP)

(73) Assignee: Mikuni Corporation, Tokyo (JP)

( * ) Notice: Subject to any disclaimer, the term of this patent is extended or adjusted under 35 U.S.C. 154(b) by 0 days.

(21) Appl. No.: 13/400,960

(22) Filed: Feb. 21, 2012

(65) Prior Publication Data

US 2012/0216652 A1    Aug. 30, 2012

(30) Foreign Application Priority Data

Feb. 21, 2011 (JP) ................. 2011-034897

(51) Int. Cl.  
*G06F 7/00* (2006.01)

(52) U.S. Cl.  
USPC .......................................... 701/36

(58) Field of Classification Search  
None  
See application file for complete search history.

(56) References Cited

U.S. PATENT DOCUMENTS

| 6,467,370 B2* | 10/2002 | Kojima et al. ............. 74/513 |
| 6,920,385 B2* | 7/2005 | Egami ....................... 701/70 |
| 2001/0022113 A1* | 9/2001 | Kojima et al. ............. 74/513 |
| 2005/0209743 A1* | 9/2005 | Egami ........................ 701/1 |
| 2010/0083789 A1* | 4/2010 | Osawa et al. ............... 74/513 |
| 2011/0087414 A1* | 4/2011 | Shiomi et al. .............. 701/70 |

FOREIGN PATENT DOCUMENTS

| JP | 2004-314871 | 11/2004 |
| JP | 2010-052721 | 3/2010 |

\* cited by examiner

*Primary Examiner* — Thomas Tarcza  
*Assistant Examiner* — Adam Alharbi (57) ABSTRACT

An accelerator pedal apparatus including an actuator pedal, a hysteresis generating mechanism which provides a hysteresis pedaling force characteristic having larger pedaling force in a depression direction than that in a return direction, and a reaction force adding control mechanism which adds operational reaction force to operation of the accelerator pedal based on an adjustment force generation command from an upper unit, while the operational reaction force added by the reaction force adding control mechanism is not larger than a hysteresis amount generated by the hysteresis generating mechanism.

5 Claims, 13 Drawing Sheets

ACCELERATOR PEDAL APPARATUS

CROSS-REFERENCE TO RELATED APPLICATIONS

This application claims the priority benefit of Japanese Patent Application No. 2011-034897, filed Feb. 21, 2011, in the Japanese Patent Office, the disclosure of which is incorporated herein by reference.

BACKGROUND

1. Field

The present disclosure relates to an accelerator pedal apparatus applied to vehicles such as automobiles, and in particular, relates to an accelerator pedal apparatus which includes a reaction force adding control mechanism which attracts a driver's attention to accelerator pedal operation by varying operational reaction force.

2. Description of the Related Art

Recently, accelerator pedal apparatuses having a reaction force adding control mechanism to vary operational reaction force against accelerator pedal operation have been developed and adopted for vehicles such as automobiles. The variation of operational reaction force due to the reaction force adding control mechanism is to attract the driver's attention. Since large variation of the operational reaction force may surprise a driver to cause incorrect operation of the accelerator pedal, it is necessary to avoid worsening the operational feeling of the accelerator pedal. Particularly, in an accelerator pedal apparatus targeting to achieve eco-driving (i.e., to improve fuel consumption), it is important to attract the driver's attention while maintaining excellent operational feeling of an accelerator pedal.

For example, Japanese Laid-open Patent Publication No. 2010-52721 discloses a technology to prevent flipping of an accelerator pedal against a driver's intentions by increasing operational reaction force of the accelerator pedal when accelerator opening reaches an accelerator opening threshold value for worsening of fuel Consumption and cancelling the increased amount of the operational reaction force when the accelerator opening is decreased to be equal to or smaller than an increased amount cancellation threshold value which is smaller than the accelerator opening threshold value by a predetermined amount.

In Japanese Laid-open Patent Publication No. 2010-52721 of the related art, a countermeasure to suppress accelerator pedal flipping by varying accelerator opening threshold values for increasing and decreasing the operational reaction force is implemented against a phenomenon that the accelerator pedal is returned as being bounced owing to momentum of pedaling force increase of the accelerator pedal when operational reaction force is added to the accelerator pedal. In this case, it is required for the accelerator opening to keep difference to some extent between the accelerator opening threshold value for operational reaction force adding and the accelerator opening threshold value for operational reaction force cancelling. Accordingly, there has been a problem that an accelerator opening capable of improving fuel consumption (i.e., an eco-driving point) is difficult to be recognized by a driver.

Based on studies as focusing on accelerator pedal behaviors at the time of adding operational reaction force to the accelerator pedal, the inventors have revealed that reaction force feelings obtained at the time of adding operational reaction force to the accelerator pedal are different between those in depressing and returning of the accelerator pedal even if the same operational reaction force with the same stroke amount is added.

Figure 7:
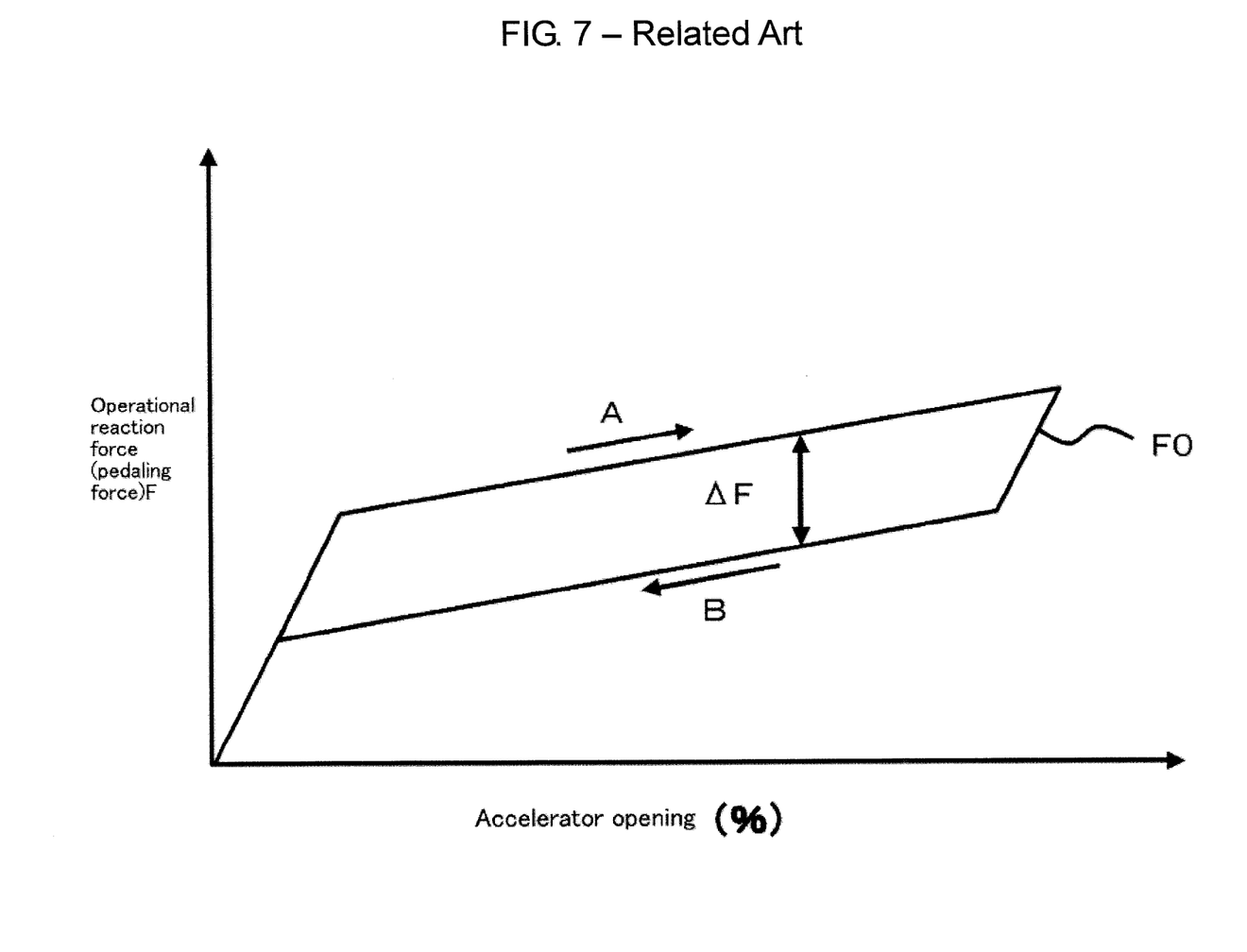
FIG. 7 is a graph indicating operational reaction force characteristics of a basic pedaling force characteristic F0.

FIG. 7 illustrates a basic pedaling force characteristic (hereinafter, called a basic pedaling force characteristic F0) of an accelerator pedal of which operational reaction force is not increased by a reaction force adding control mechanism. An appropriate hysteresis characteristic (i.e., a hysteresis amount $\Delta F$) is provided between a depression direction (arrow A) in which the accelerator opening is enlarged with depressing of the accelerator pedal and a return direction (arrow B) in which the accelerator opening is lessened with returning of the accelerator pedal. Here, the operational reaction force F in the depression direction is set to be larger than the operational reaction force F in the return direction even at the same accelerator opening. Since the appropriate hysteresis characteristic is provided as described above, the accelerator opening can be easily maintained at constant owing to the hysteresis amount $\Delta F$ even when accelerator depressing force is varied to some extent.

Figure 8A:
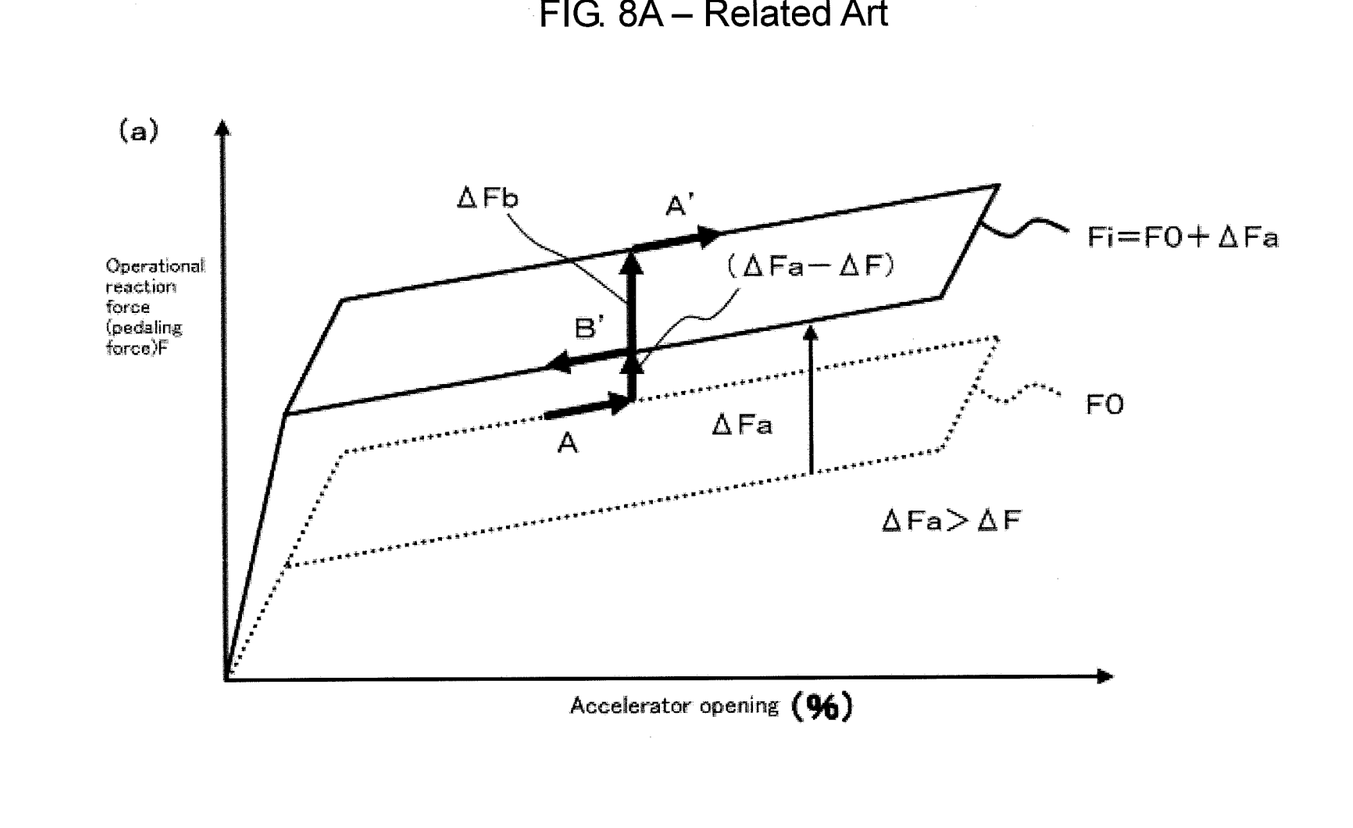
FIG. 8A is an explanatory graph for variation of the operational reaction force F when the adjustment force ΔFa is added during depressing.
Figure 8B:
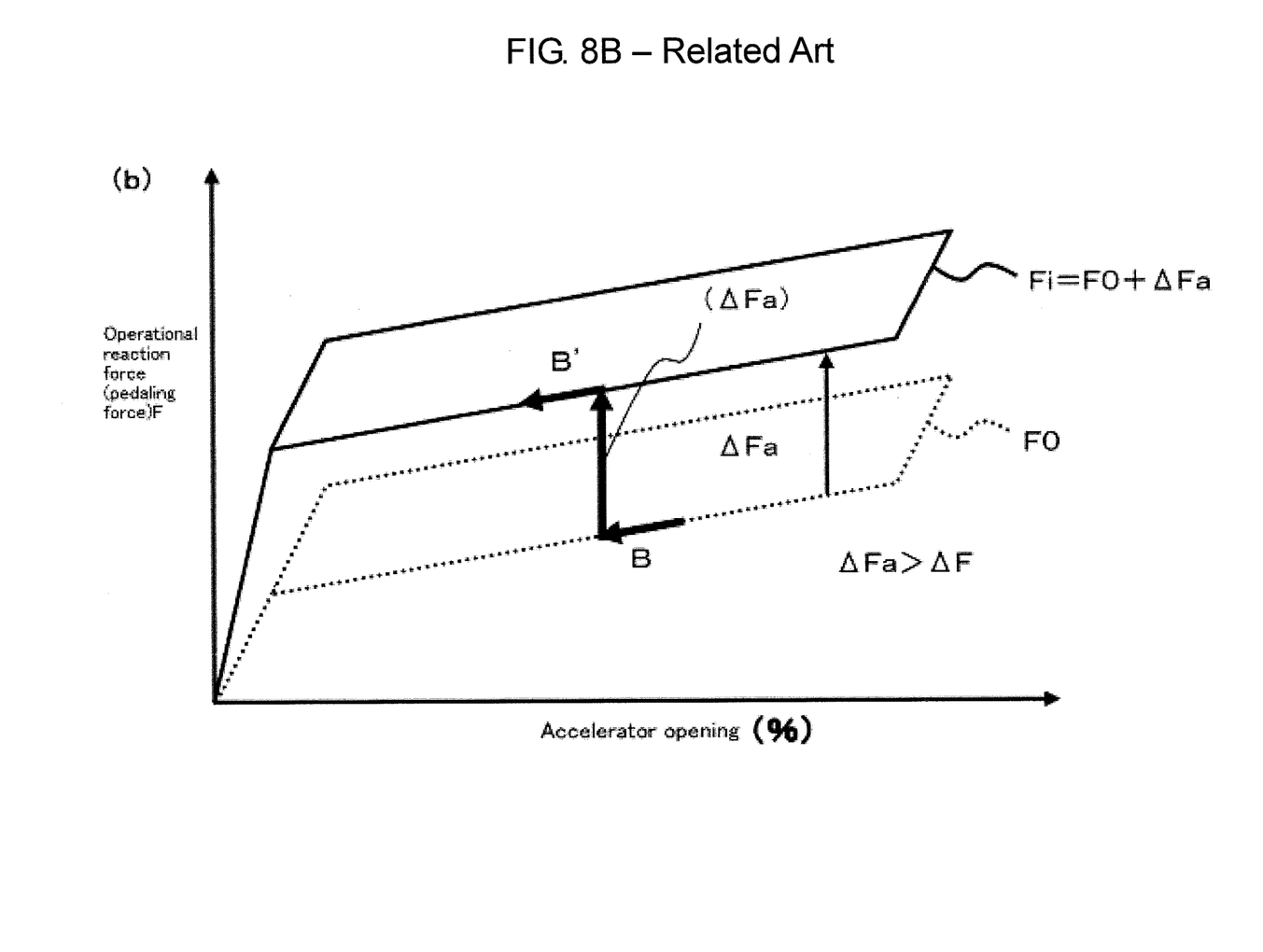
FIG. 8B is an explanatory view for variation of the operational reaction force F when the adjustment force ΔFa is added during returning.
Figure 8C:
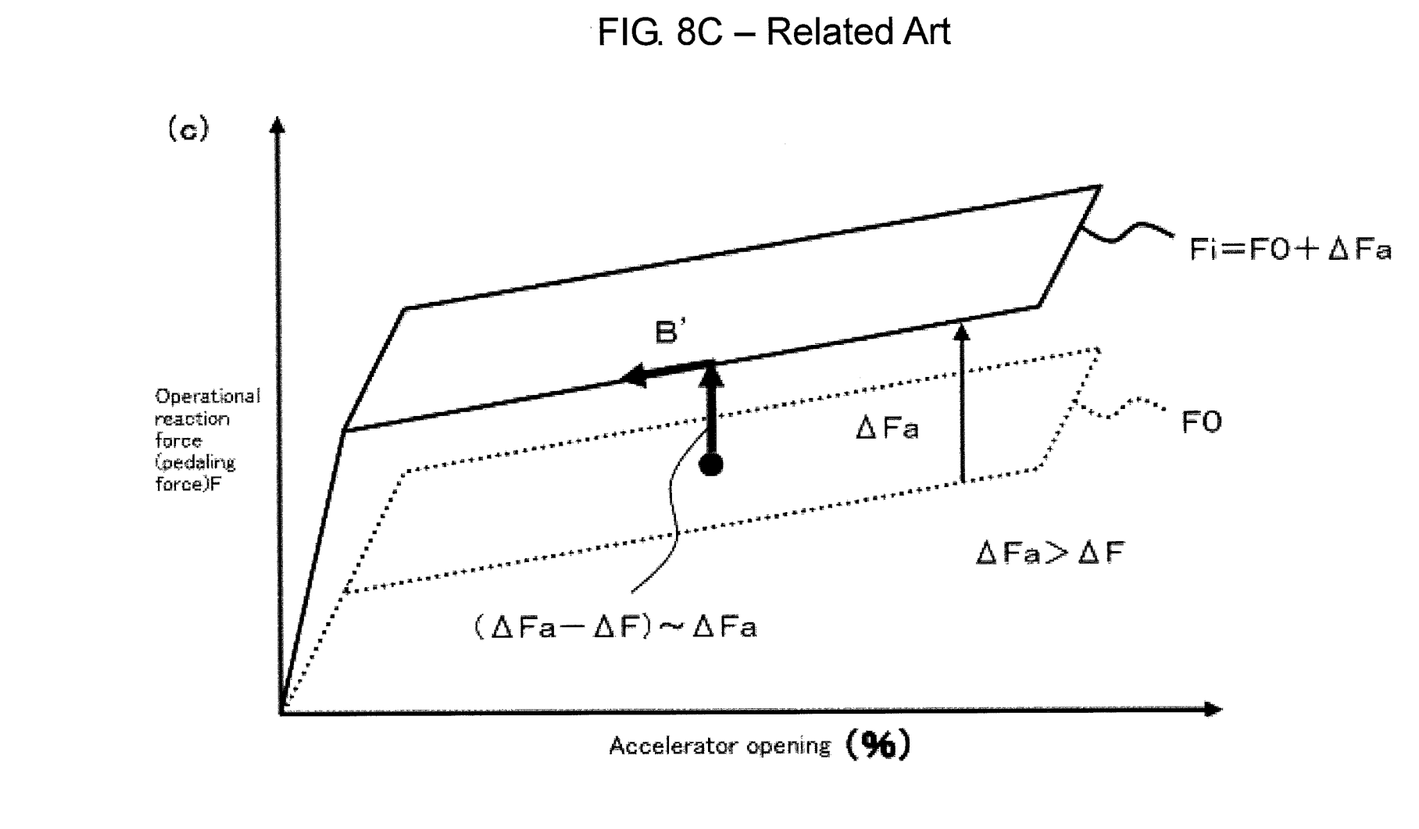
FIG. 8C is an explanatory view for variation of the operational reaction force F when the adjustment force ΔFa is added in a stopped state.

In FIGS. 8A to 8C, a dotted line indicates a basic pedaling force characteristic line of the basic pedaling force characteristic F0 and a solid line indicates an operational reaction force characteristic line (hereinafter, called increased operational reaction force Fi) in a state that adjustment force $\Delta Fa$ (i.e., operational reaction force) is added to the basic pedaling force characteristic F0 by the reaction force adding control mechanism. When the adjustment force $\Delta Fa$ (i.e., the operational reaction force) is added by the reaction force adding control mechanism, it is shifted to the operational reaction force characteristic line in the return direction (arrow B') of the operational reaction force characteristic line of the increased operational reaction force Fi in every case that accelerator operation before the adjustment force $\Delta Fa$ (i.e., the operational reaction force) is added is in the depression direction, in the return direction, or in a stopped state. When pedaling force being $\Delta Fb$ or larger is applied as the driver continues to further depress the accelerator pedal against the operational reaction force, it is shifted to the operational reaction force characteristic line in the depressing direction (arrow A') of the operational reaction force characteristic line of the increased operational reaction force Fi. Accordingly, as long as pedaling force being $\Delta Fb$ or larger is not applied to the accelerator pedal by the driver after the operational reaction force is added, the operational reaction force F is increased by the amount of $\Delta Fa-\Delta F$ as illustrated in FIG. 8A when the adjustment force $\Delta Fa$ is added to the basic pedaling force characteristic F0 by the reaction force adding control mechanism while the accelerator pedal operation is in the depression direction (arrow A). When the adjustment force $\Delta Fa$ is added to the basic pedaling force characteristic F0 by the reaction force adding control mechanism while the accelerator pedal operation is in the return direction (arrow B), the operational reaction force F is increased by the amount of $\Delta Fa$ as illustrated in FIG. 8B. When the adjustment force $\Delta Fa$ is added to the basic pedaling force characteristic F0 by the reaction force adding control mechanism while the accelerator pedal operation is in a stopped state, the operational reaction force F is increased by the amount in a range between $\Delta Fa-\Delta F$ and $\Delta Fa$ as illustrated in FIG. 8C in accordance with the depression force of the accelerator pedal. In this manner, the increased amount of the operational reaction force F is varied in the range between $\Delta Fa-\Delta F$ and $\Delta Fa$ depending on the operational direction of the accelerator pedal as being influenced by the hysteresis characteristic.

As described above, the same reaction force feeling cannot be provided to the driver even if the same operational reaction force at the same stroke amount is added to the accelerator pedal. Accordingly, when trying to recognize the eco-driving point, the driver feels a sense of strangeness as causing worsened operability. Since the above contributes to accelerator pedal flipping and disturbs fuel consumption improvement, an accelerator pedal especially targeting eco-driving (i.e., fuel consumption improvement) cannot achieve the primary target.

SUMMARY

To address the above issues, the present disclosure provides an accelerator pedal apparatus having pedaling force characteristics with hysteresis capable of preventing operational feeling worsening accompanied by operational reaction force generation while clearly notifying an eco-driving point.

To address the above issues, the present disclosure provides an accelerator pedal apparatus including an accelerator pedal, a hysteresis generating mechanism which provides a hysteresis pedaling force characteristic having larger pedaling force in a depression direction than that in a return direction, and a reaction force adding control mechanism which adds operational reaction force to operation of the accelerator pedal based on an adjustment force generation command from an upper unit. Here, the operational reaction force added by the reaction force adding control mechanism is not larger than a hysteresis amount generated by the hysteresis generating mechanism.

The accelerator pedal apparatus may further include operation detector which detects whether motion of the accelerator pedal is in the depression direction or the return direction. Here, the reaction force adding control mechanism adds the operational reaction force which is not larger than the hysteresis amount generated by the hysteresis generating mechanism in a case that the motion of the accelerator pedal is detected as being in the depression direction by the operation detector while the adjustment force generation command is provided from the upper unit, and the reaction force adding control mechanism does not add the operational reaction force in a case that the motion of the accelerator pedal is detected as being in the return direction by the operation detector while the adjustment force generation command is provided from the upper unit.

According to the present disclosure, worsening of operational feeling corresponding to operational reaction force generation can be prevented with a structure that the operational reaction force is not added in a case that motion of the acceleration pedal is detected as being in the return direction at the time of receiving an adjustment force generation command from an upper unit.

BRIEF DESCRIPTION OF THE DRAWINGS

These and/or other aspects and advantages will become apparent and more readily appreciated from the following description of the embodiments, taken in conjunction with the accompanying drawings of which:

FIGS. 5A to 5C are explanatory graphs indicating operational reaction force characteristics for adjustment force generating operation when an adjustment force generation command eco is inputted to the accelerator pedal apparatus of the embodiment according to the present disclosure; where

FIGS. 8A to 8C are explanatory graphs indicating operational reaction force characteristics in a state that an adjustment force ΔFa is added to the basic pedaling force characteristic F0; where

DESCRIPTION OF EMBODIMENTS

In the following, embodiments of the present disclosure will be described with reference to the drawings. An accelerator pedal apparatus 10 of a present embodiment is adopted for an electrically controlled throttle system (i.e., a drive-by-wire system). As illustrated in FIGS. 1A, 1B, 2 and 3, the accelerator pedal apparatus 10 includes a housing 11 which is fixed to a vehicle body of an automobile and the like, a pedal arm 13 which has an accelerator pedal 12 and which is swingably supported by the housing 11, a return spring 14 which exerts urging force to return the pedal arm 13 toward a rest position, a hysteresis generating mechanism 20 which generates hysteresis at pedaling force characteristics, an accelerator pedal position sensor (APS) 15 which detects a rotational angle of the pedal arm 13 due to operation of the accelerator pedal 12 as the accelerator opening and which outputs the detected accelerator opening as an APS signal to an engine control unit (ECU) 50 being an upper unit, a reaction force adding control mechanism 30 which varies operational reaction force F against operation of the accelerator pedal 12 by generating operational reaction force, and a control unit (a control board) 40 which generates the operational reaction force by controlling the reaction force adding control mechanism 30 based on an adjustment force generation command input from the ECU 50 via a controller area network (CAN) communication line.

The APS 15 is a position sensor which detects the rotational angle of the pedal arm 13 as the accelerator opening as being arranged around a swing axis L of the pedal arm 13 in a sensor accommodating portion 11a formed in the housing 11. For example, the APS 15 being required to detect the rotational angle of the pedal arm 13 with high accuracy may adopt a non-contact type magnetic sensor which detects the rotational angle of the pedal arm as the accelerator opening by detecting variation of magnetic flux density with a Hall element while varying the magnetic flux density around the swing axis L in accordance with the swinging of the pedal arm 13.

Figure 3:
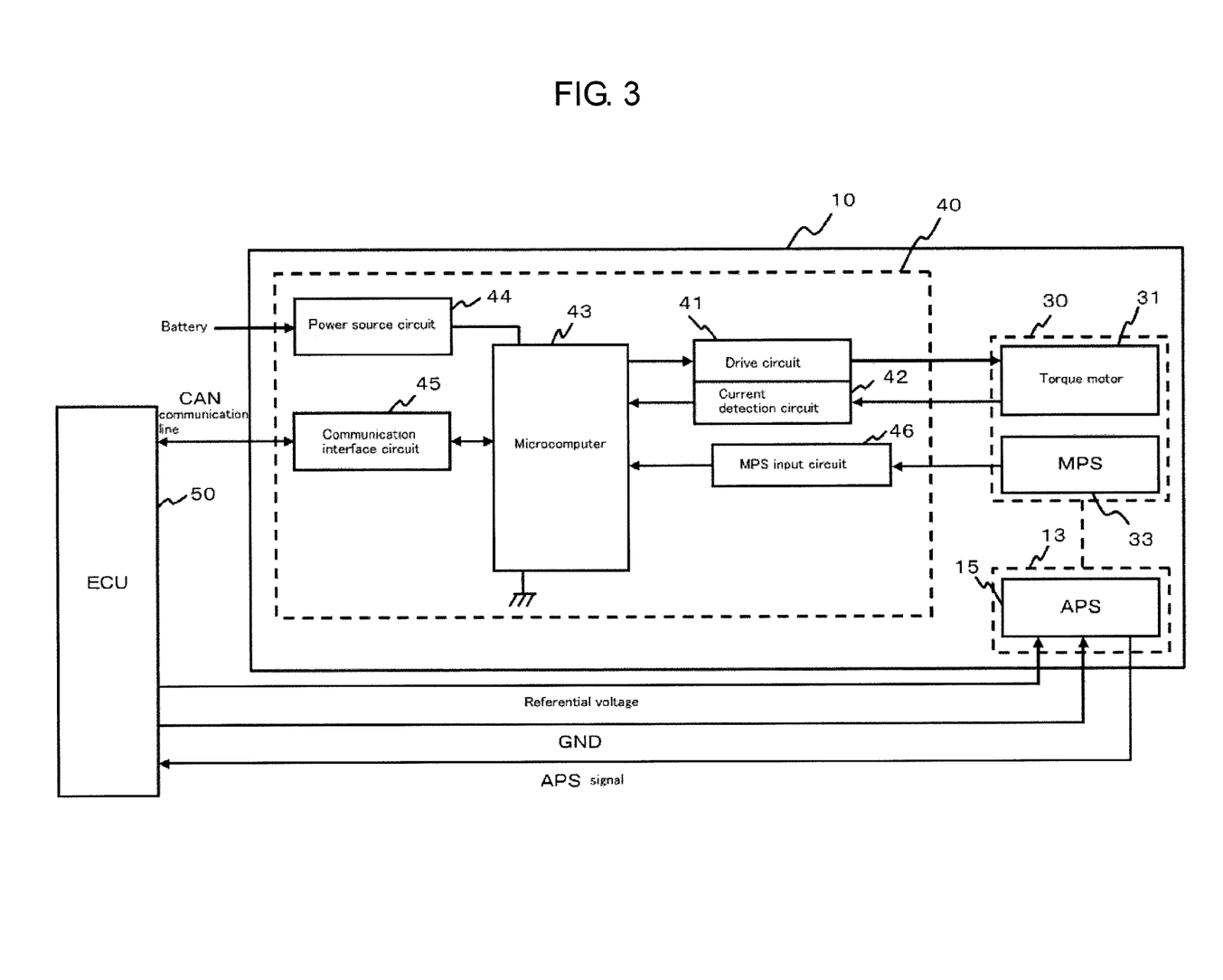
FIG. 3 is a schematic block diagram illustrating the structure of the accelerator pedal apparatus of the embodiment according to the present disclosure.

The APS 15 functions as an accelerator position detector which detects the accelerator opening of the accelerator pedal 12 and outputs the accelerator opening to the ECU 50. As being a main component to transmit accelerator operation to the ECU 50, the APS 15 is structured to be directly controlled by the ECU 50 which is an upper unit. That is, as illustrated in FIG. 3, reference voltage and ground voltage (GND) are supplied from the ECU 50 to the APS 15. The Hall element of the APS 15 is driven at constant voltage by the ECU 50. Further, the APS signal output from the APS 15 is a voltage signal output in accordance with the magnetic flux density and is directly input to the ECU 50 without passing through the control unit (control substrate) 40. Thus, driving is safely continued even in a case that a failure occurs at the control unit 40.

Figure 1A:
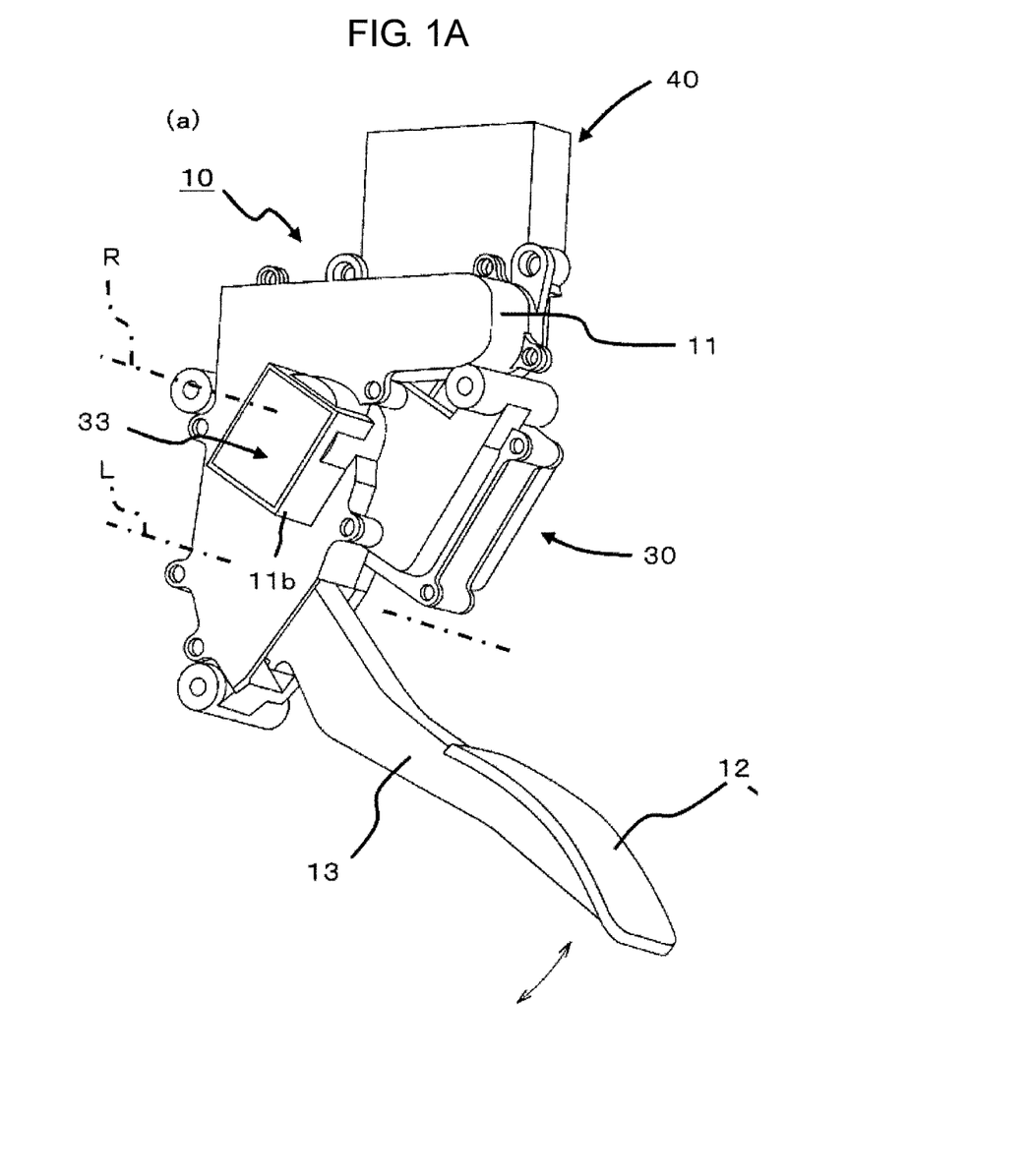
FIG. 1A is a perspective view and FIG. 1B is a side view illustrating a structure of an accelerator pedal apparatus of an embodiment according to the present disclosure.
Figure 1B:
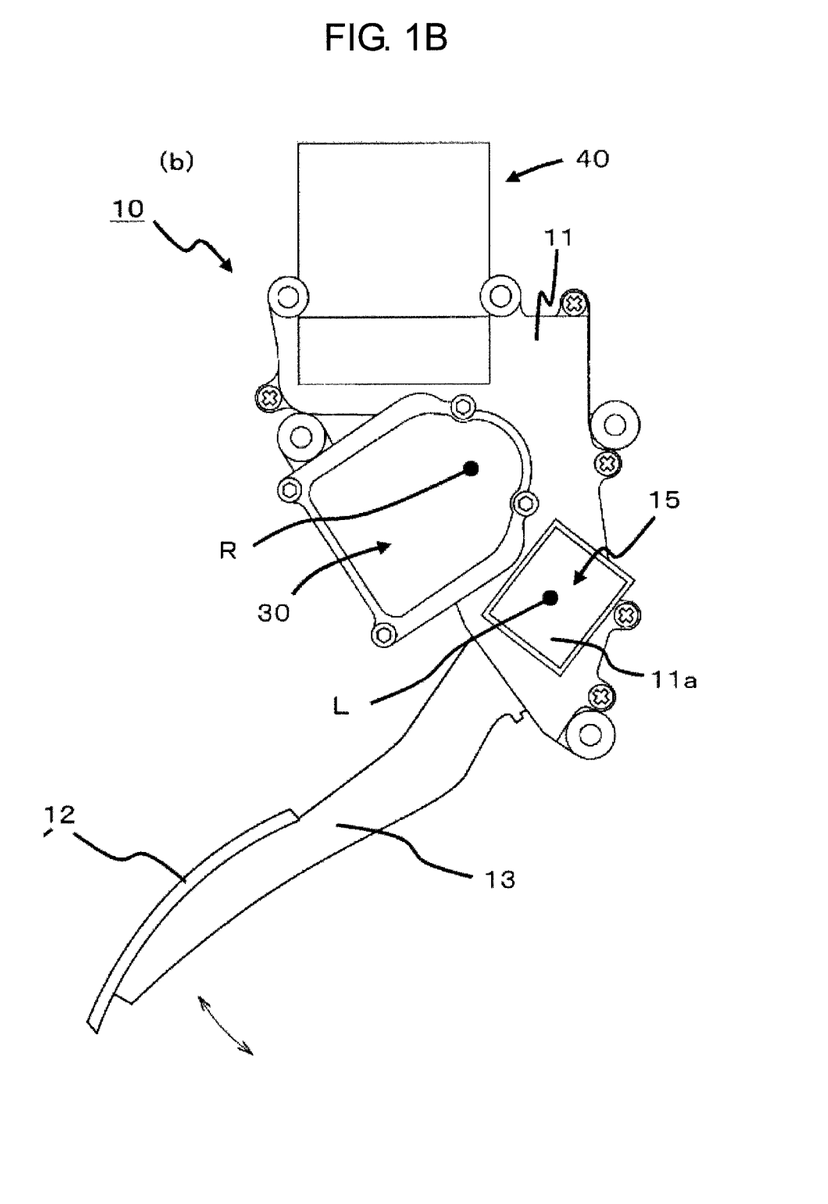
Figure 2:
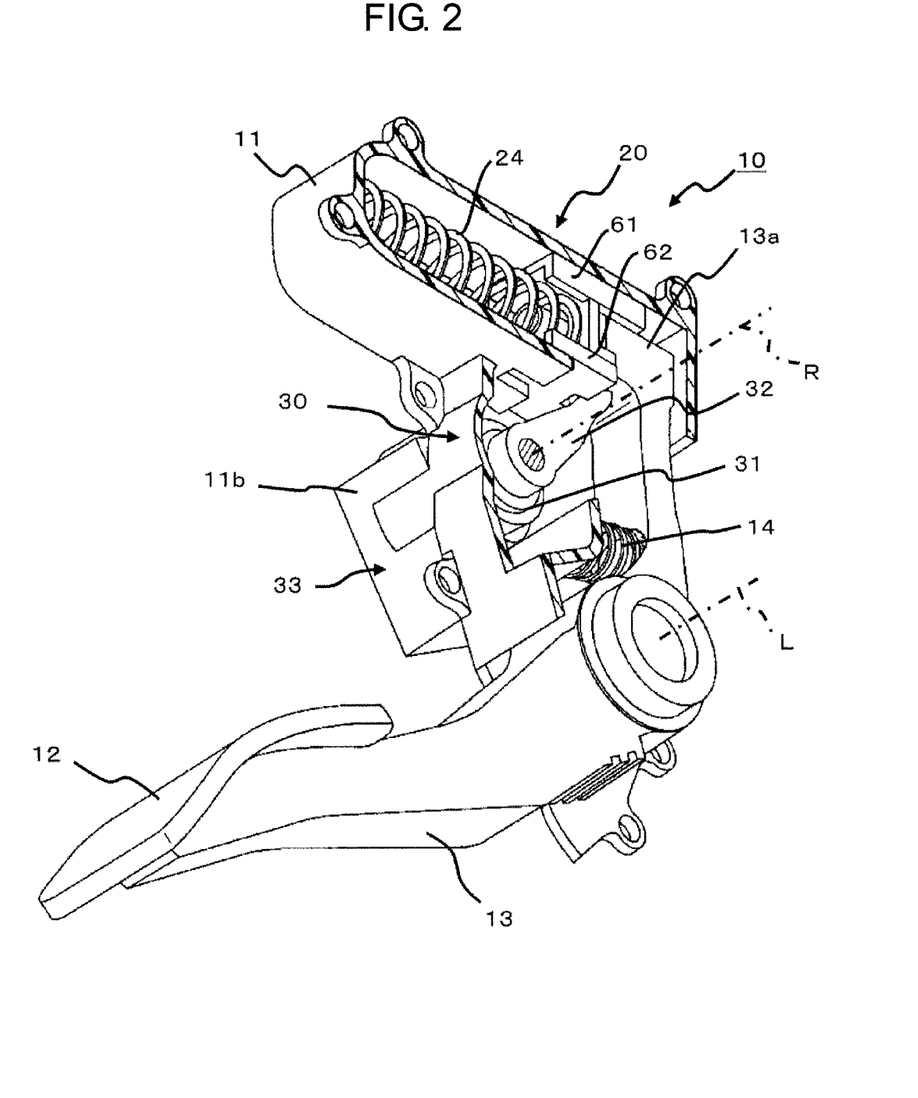
FIG. 2 is a perspective view illustrating an inner structure of the accelerator pedal apparatus of the embodiment according to the present disclosure.

As illustrated in FIG. 2, the hysteresis generating mechanism 20 includes a first slider 61, a second slider 62, and a return spring 24 which are accommodated in the housing 11. The first slider 61 and the second slider 62 are engaged with an upper end portion 13a of the pedal arm 13 as being detachably attachable. The first slider 61 and the second slider 62 generate frictional force with an inner wall face of the housing 11 owing to depressing pedaling force of the accelerator pedal 12. The hysteresis generating mechanism 20 generates hysteresis on the pedaling force (i.e., a pedal load) owing to the frictional force and functions as first operational reaction force adder which provides the basic pedaling force characteristic F0 as illustrated in FIG. 7 to the operation of the accelerator pedal 12. The basic pedaling force characteristic F0 denotes the operational reaction force F in a state that operational reaction force (i.e., adjustment force ΔFa which is described later) is not added by controlling the reaction force adding control mechanism 30. In this hysteresis characteristics, the operational reaction force F in the depression direction indicated by arrow A is larger than the operational reaction force F in the return direction indicated by arrow B. The difference between the operational reaction force F in the depression direction and the operational reaction force F in the return direction is to be a hysteresis amount ΔF.

The reaction force adding control mechanism 30 functions as a second operational reaction force adder which adds adjustment force ΔFa being operational reaction force to the operation of the acceleration pedal 12 in addition to the basic pedaling force characteristic F0. As illustrated in FIG. 2, the reaction force adding control mechanism 30 includes a torque motor 31 of which rotation axis R is arranged at a position being different from the swing axis L of the pedal arm 13, a return lever 32 which is arranged at the rotation axis R and which adds the adjustment force ΔFa as being contacted to the pedal arm 13, and a motor position sensor (MPS) 33. The torque motor 31 functions as a drive source for generating the adjustment force ΔFa. The return lever 32 follows the swinging of the pedal arm 13 owing to magnetic spring action due to magnets (not illustrated) arranged in the torque motor 31 even when motor torque (i.e., drive force) is not exerted by the torque motor 31. Accordingly, a rotation shaft of the torque motor 31 is rotated in accordance with the swinging of the pedal arm 13. On the other hand, when the motor torque (i.e., the drive force) is exerted by the torque motor 31, the adjustment force ΔFa is exerted to the pedal arm 13 in a direction to push back toward the rest position owing to action of the return lever 32 against the upper end portion 13a of the pedal arm 13.

The MPS 33 is arranged at the sensor accommodating portion 11b formed at the housing 11. The MPS 33 functions as motor position detector to detect a rotational angle of the torque motor 31 as a motor angle and outputs the motor angle to the control unit 40. Since the rotation shaft of the torque motor 31 is rotated in accordance with the swinging of the pedal arm 13, the motor angle output from the MPS 33 is increased with depressing of the pedal arm 13 and is decreased with returning of the pedal arm 13. Here, the MPS 33 may be a sensor of a contact type or a non-contact type.

The control unit 40 functions as reaction force controller which adds the adjustment force ΔFa by controlling driving of the torque motor 31. As illustrated in FIG. 3, the control unit 40 includes a drive circuit 41 which drives the torque motor 31 with a PWM signal, a current detection circuit 42 which detects an actual motor current value being an actual current value flowing through the torque motor 31, a microcomputer 43 which controls generation of the adjustment force ΔFa utilizing the torque motor 31 being the drive source, a power source circuit 44 which supplies power from a battery (not illustrated) to the microcomputer 43, a communication interface circuit 45 being an interface circuit connected to a CAN communication line, and an MPS input circuit 46 which inputs, to the microcomputer 43, the MPS signal output from the MPS 33.

Figure 4:
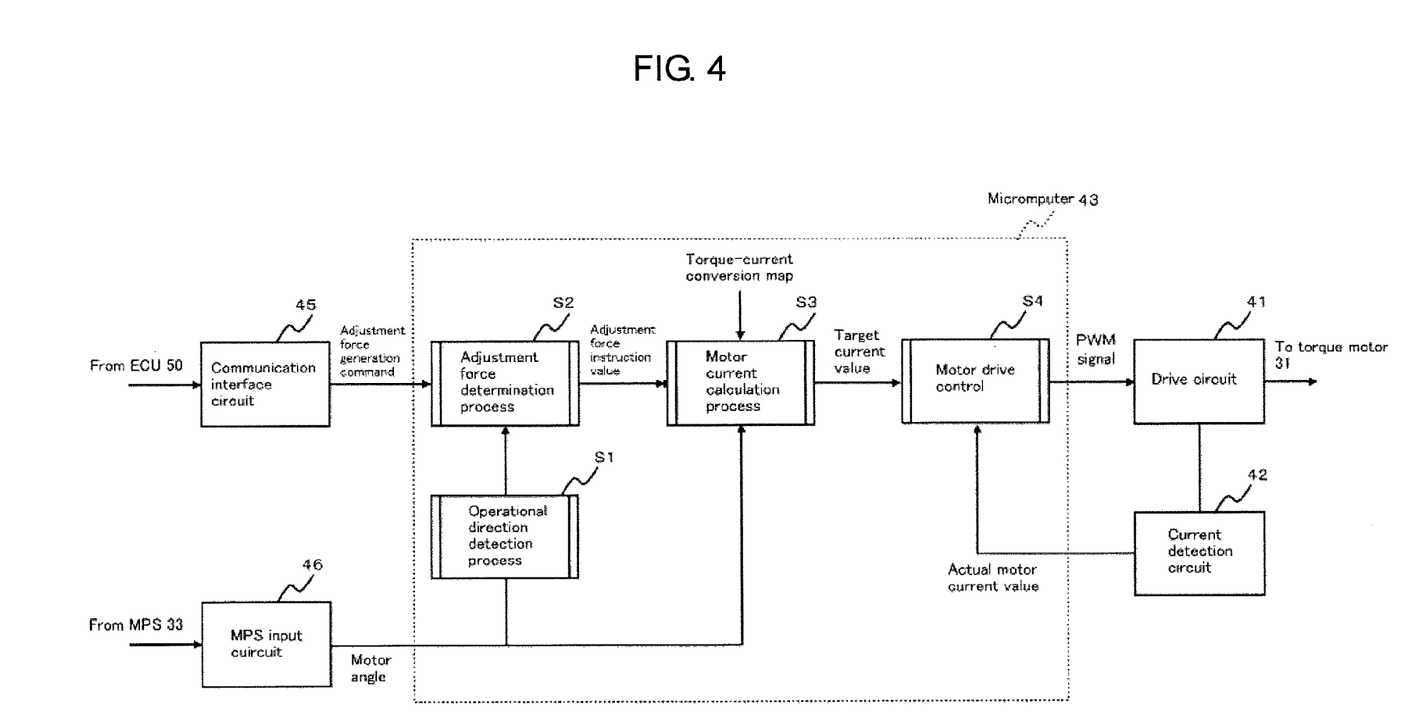
FIG. 4 is an explanatory data flowchart for operation of the accelerator pedal apparatus of the embodiment according to the present disclosure.

Next, operation of adjustment force generation in the accelerator pedal apparatus 10 according to the present embodiment will be described with reference to FIGS. 4 and 5.

When the need for attracting the driver's attention arises based on various information regarding driving situations, the ECU 50 outputs the adjustment force generation command instructing to generate the adjustment force ΔFa against the accelerator pedal apparatus 10 to the accelerator pedal apparatus via the CAN communication line. For example, the adjustment force generation command to be output from the ECU 50 is output when it is determined that fuel consumption is to be worsened if the accelerator pedal 12 is further depressed based on evaluation of driving situations (engine speed, vehicle speed, a load, and the like). The accelerator opening of the accelerator pedal 12 at that time is to be the eco-driving point.

The adjustment force generation command input to the accelerator pedal apparatus 10 via the CAN communication line is input to the microcomputer 43 via the communication interface circuit 45 of the control unit 40. The microcomputer 43 to which the adjustment force generation command is input performs an operational direction detection process S1 to detect the operational direction of the accelerator pedal 12 and an adjustment force determination process S2 to determine magnitude of the adjustment force ΔFa which is to be generated by the reaction force adding control mechanism 30.

The operational direction detection process S1 is performed by detecting variation of the motor angle in each unit time input from the MPS 33 via the MPS input circuit 46. When the difference of the motor angle is positive with depressing of the pedal arm 13, it is detected as being in the depression direction. When the difference of the motor angle is negative with returning of the pedal arm 13, it is detected as being in the return direction. Here, when the pedal arm 13 is stopped without variation of the motor angle, it is detected as being in the return direction. In the operational direction detection process S1, it is only required to detect the operational direction. Therefore, it is also possible to adopt an APS signal output from the APS 15 instead of the motor angle output from the MPS 33. Alternatively, it is also possible to adopt another sensor capable of detecting the operational direction. Here, the MPS 33 and the APS 15 are examples of operation detectors. Further, since the adjustment force generation command is input at irregular timing, it is preferable to continuously perform the operational direction detection process S1.

The adjustment force determination process S2 determines an adjustment force instruction value indicating magnitude of the adjustment force ΔFa based on the input adjustment force generation command and the operational direction detected in the operational direction detection process S1. In the adjustment force determination process S2, when the operational direction detected in the operational direction detection process S1 is the depression direction, the adjustment force instruction value is determined as the hysteresis amount ΔF of the basic pedaling force characteristic F0 which is generated by the hysteresis generating mechanism 20.

Next, the microcomputer 43 performs a motor current calculation process S3 to calculate a target current value for driving the motor torque 31. The microcomputer 43 previously stores a torque-current conversion map in which the current value to be applied to the torque motor 31 to obtain the target adjustment force ΔFa and the motor angle of the torque motor 31 are corresponded. The microcomputer 43 calculates the target current value to be applied to the torque motor 31 from the determined adjustment force instruction value ΔF by utilizing the torque-current conversion map as the motor current calculation process S3.

The target current value calculated in the motor current calculation process S3 is compared with the actual current value of the torque motor 31 detected by the current detection circuit 42 in motor drive control S4. By performing the motor drive control S4, the difference between the target current value and the actual current value is calculated as the PWM signal as a required current value to be applied to the torque motor 31. Further, in the motor drive control S4, the PWM signal is output to the drive circuit 41 as being corrected in accordance with actual battery voltage while comparing the actual battery voltage being the current power voltage with referential battery voltage.

The PWM signal is input to the drive circuit 41 from the microcomputer 43 as a required current value, and then, feedback control is performed with the actual motor current value detected by the current detection circuit 42 while driving the torque motor 31. Accordingly, the adjustment force ΔFa being the same as the hysteresis amount ΔF of the basic pedaling force characteristic F0 is generated by the torque motor 31, so that the adjustment force ΔFa is added to the basic pedaling force characteristic F0. In FIG. 5A, a dotted line indicates an operational reaction force characteristic line of the basic pedaling force characteristic F0 and a solid line indicates an operational reaction force characteristic line (hereinafter, called increased operational reaction force Fi) in a state that the adjustment force ΔFa is added to the basic pedaling force characteristic F0 by the reaction force adding control mechanism 30.

Figure 5A:
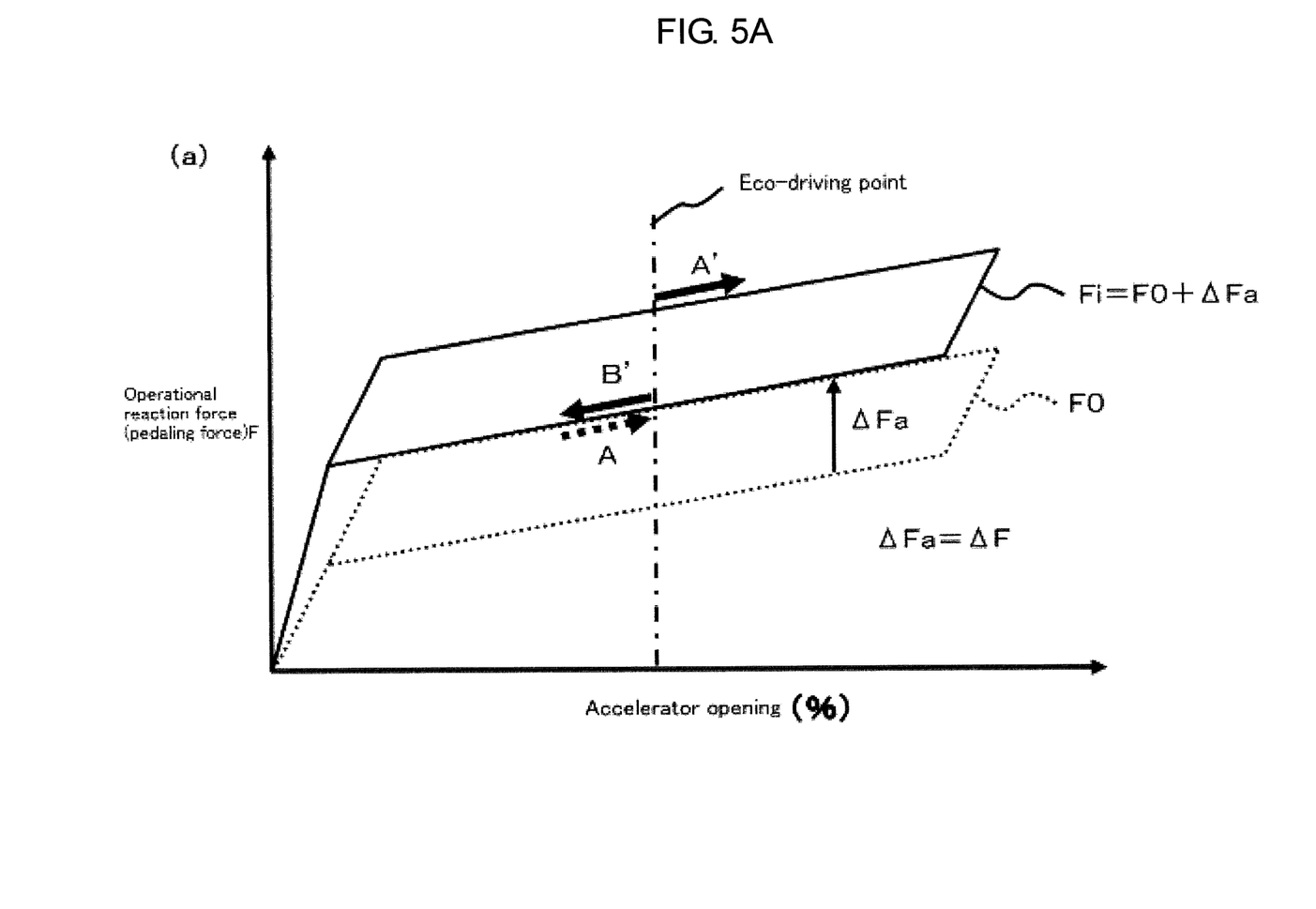
FIG. 5A is an explanatory graph for variation of operational reaction force F when the adjustment force generation command eco is inputted during depressing.
Figure 5B:
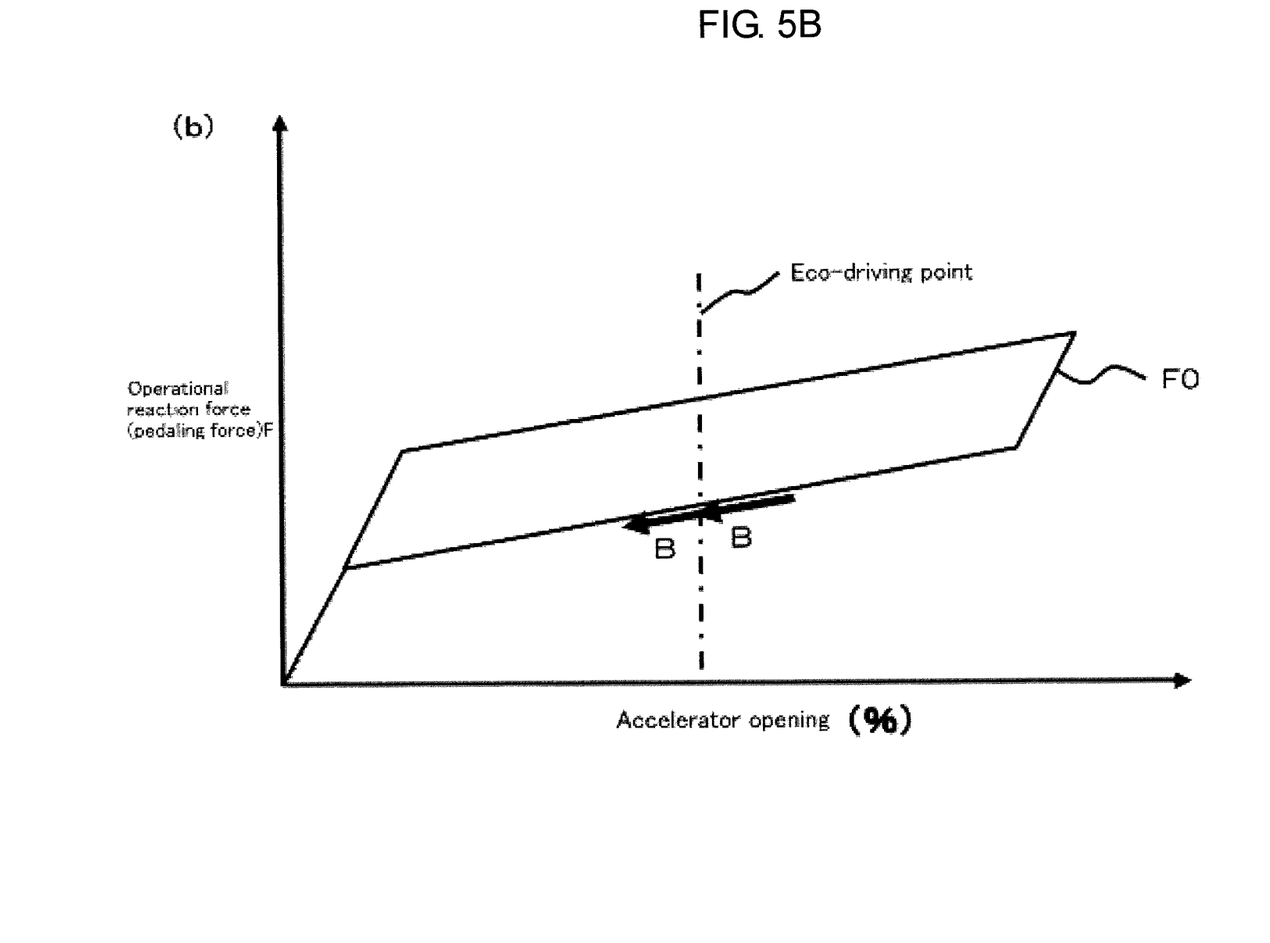
FIG. 5B is an explanatory graph for variation of the operational reaction force F when the adjustment force generation command eco is inputted during returning.
Figure 5C:
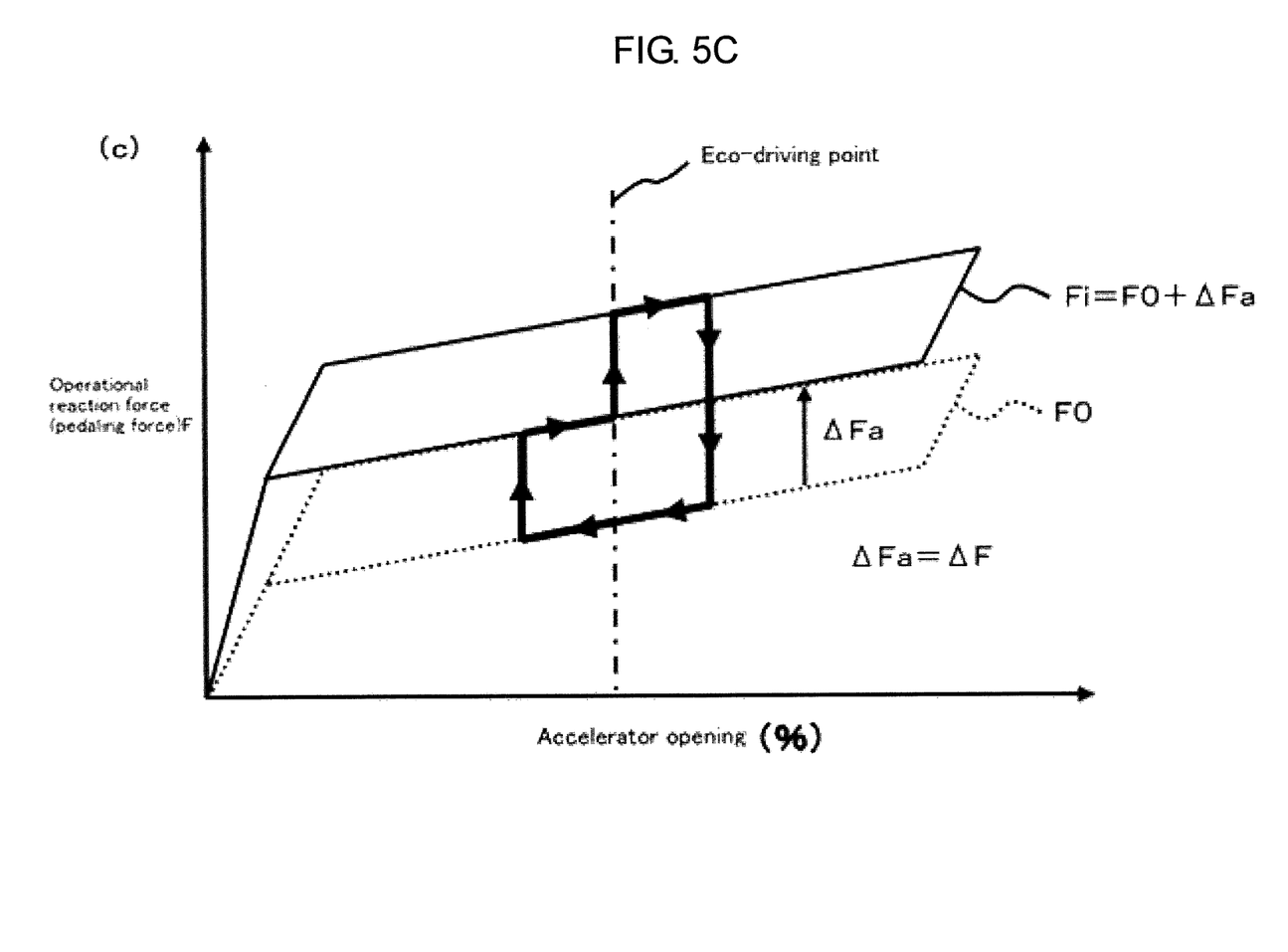
FIG. 5C is an explanatory graph for variation of the operational reaction force F under respective conditions.

In a case that the adjustment force ΔFa being the same as the hysteresis amount ΔF of the basic pedaling force characteristic F0 is added to the basic pedaling force characteristic F0 as described above, the pedaling force F in the depression direction indicated by dotted arrow A in the basic pedaling force characteristic F0 and the pedaling force F in the return direction indicated by arrow B' in the reaction-force-increased pedaling force Fi (i.e., the increased operational reaction force Fi) are to be matched as illustrated in FIG. 5A.

As described above, in a case that the adjustment force ΔFa being the operational force is added to the basic pedaling force characteristic F0 by the reaction force adding control mechanism 30, the pedaling force is shifted to the operational reaction force characteristic line in the return direction of the operational reaction force characteristic line (arrow B'). Accordingly, in a case that the adjustment force ΔFa is added so that the pedaling force F in the depression direction indicated by dotted arrow A in the basic pedaling force characteristic F0 and the pedaling force F in the return direction indicated by arrow B' in the reaction-force-increased pedaling force Fi (i.e., the increased operational reaction force Fi) are to be overlapped, there is no feeling that the accelerator pedal 12 is bounced or returned even when the adjustment force is generated. When the driver tries to further depress the accelerator pedal 12, the pedaling force being larger than the adjustment force ΔFa is further required for depressing the accelerator pedal 12 as the operational reaction force F indicated by arrow A' in the depression direction of the operational reaction force characteristic line. Since the pedaling force required to depress the accelerator pedal 12 becomes large, the driver cannot depress the accelerator pedal 12 with the same as before and feels a wall-like sense (a sense of resistance). However, when the accelerator pedal 12 is continuously depressed with the pedaling force being larger than the adjustment force ΔFa, the pedaling force characteristic is shifted to arrow A' of the operational reaction force characteristic line in the depression direction. Thus, since bouncing of the accelerator pedal 12 is prevented, it is possible to naturally attract the driver's attention while clearly notifying the eco-driving point without losing operational feeling. In addition, further depressing can be performed while proving the wall-like sense to the accelerator pedal 12.

Figure 6:
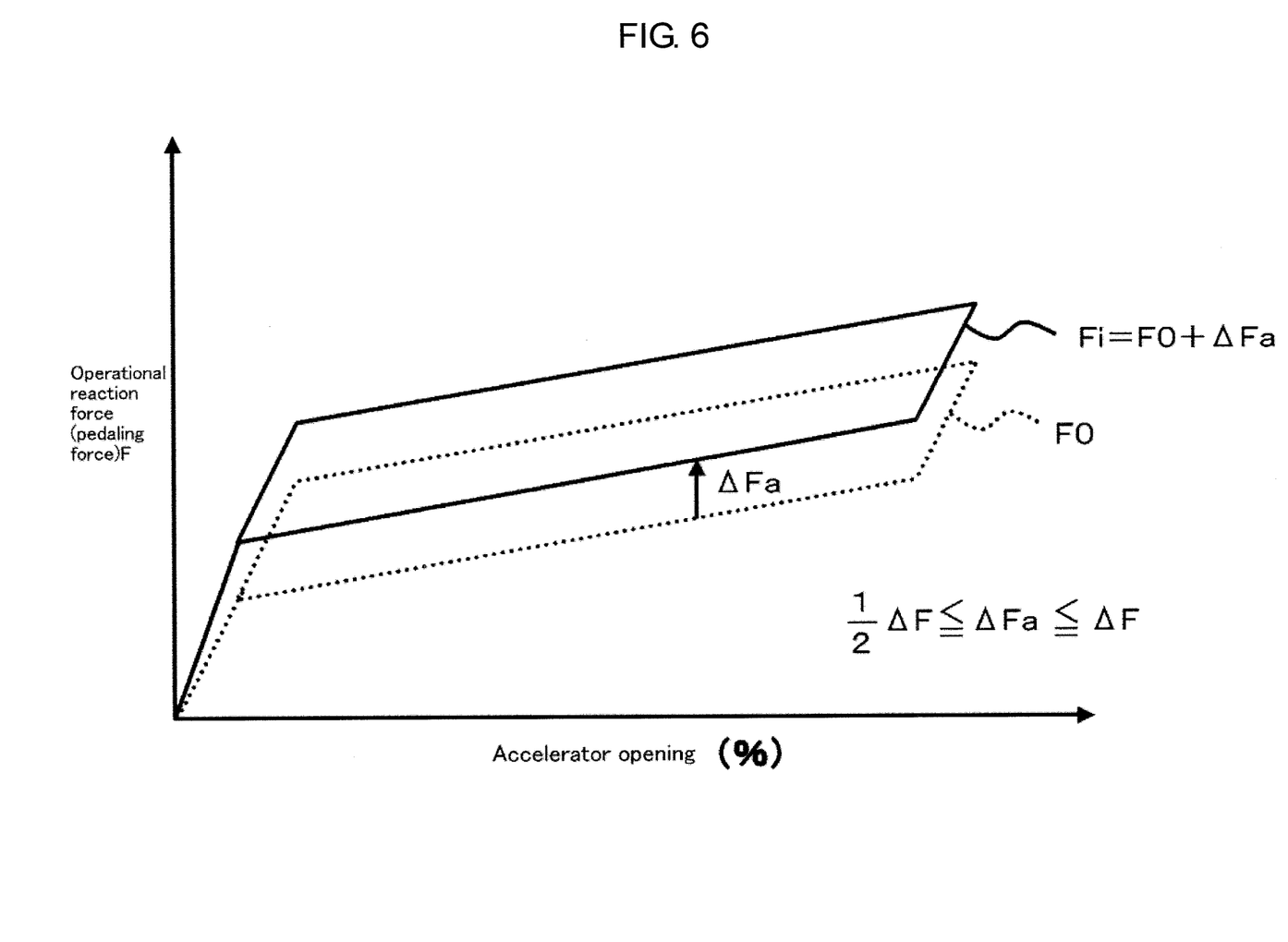
FIG. 6 is an explanatory graph indicating operational reaction force characteristics for adjustment force generating operation when the adjustment force generation command eco is inputted to an accelerator pedal apparatus of another embodiment according to the present disclosure.

In the present embodiment, the adjustment force ΔFa is set to be equal to the hysteresis amount ΔF when the operational direction detected in the operational direction detection process S1 is the depression direction. Here, it is preferable that the adjustment force ΔFa is not smaller than a half of the hysteresis amount ΔF and not larger than the hysteresis amount ΔF, as illustrated in FIG. 6. That is, as long as the adjustment force ΔFa is smaller than the hysteresis amount ΔF as illustrated in FIG. 6, the operational reaction force F of the increased operational reaction force Fi in the return direction falls below the pedaling force F of the basic pedaling force characteristic F0 in the depression direction. Accordingly, operational feeling is not worsened without having feeling of bouncing or returning of the accelerator pedal 12. However, when the adjustment force ΔFa is set to be extremely small compared to the hysteresis amount ΔF, the wall-like sense cannot be obtained at the time of further depressing the accelerator pedal 12.

In the adjustment force determination process S2, when the operational direction detected in the operational direction detection process S1 is the return direction, the microcomputer 43 does not determine the adjustment force instruction value and does not have the reaction force adding control mechanism 30 generate the adjustment force ΔFa. Accordingly, even when the adjustment instruction command is input, the operational reaction force F in the return direction indicated by arrow B at the basic pedaling force characteristic F0 does not vary, as illustrated in FIG. 5B. Thus, operational feeling is not worsened without having feeling of bouncing or returning of the accelerator pedal 12.

Here, once the adjustment force generation command is input, the adjustment force generation command is maintained in the microcomputer 43 until an adjustment force cancellation command to instruct cancellation of the adjustment force ΔFa is input. Accordingly, in a case that the adjustment force ΔFa is not generated by the reaction force adding control mechanism 30 without determining the adjustment force instruction value in the adjustment force determination process S2 and that the depression direction is detected in the operational direction detection process S1 while the adjustment force generation command is maintained, the above-mentioned adjustment force determination process S2 is performed again and the adjustment force ΔFa being the same as the hysteresis amount ΔF of the basic pedaling force characteristic F0 is to be added to the basic pedaling force characteristic F0. That is, even in a case that the operational direction is once detected as being the return direction in the operational direction detection process S1 and that the adjustment force ΔFa is not generated by the reaction force adding control mechanism 30 without determining the adjustment force instruction value, the operational direction is detected as being the depression direction in the operational direction detection process S1 when the accelerator opening arrives at the eco-driving point with further depression of the accelerator pedal 12. Then, the adjustment force ΔFa is added to the basic pedaling force characteristic F0 by the reaction force adding control mechanism 30 as illustrated in FIG. 5C. In contrast, in a case that the adjustment force ΔFa is generated by the reaction force adding control mechanism 30 and that the return direction is detected in the operational direction detection process S1, adding of the adjustment force ΔFa by the reaction force adding control mechanism 30 is cancelled, as illustrated in FIG. 5C. Accordingly, when the accelerator pedal 12 is depressed again at the accelerator opening being equal to the eco-driving point or larger, the operational direction is detected as being the depressing direction in the operational direction detection process S1 and the adjustment force ΔFa is to be added to the basic pedaling force characteristic F0 by the reaction force adding control mechanism 30.

In the present embodiment, the operational direction detection process S1 and the adjustment force determination process S2 are performed by the microcomputer 43 of the accelerator pedal apparatus 10. Here, it is also possible that the ECU 50 being the upper unit performs either or both of the operational direction detection process S1 and the adjustment force determination process S2. In this case, it is considered that an accelerator pedal apparatus of the present disclosure includes the function to perform the operational direction detection process S1 and the adjustment force determination process S2 at the ECU 50.

Here, not limited to the above embodiments, the present invention may be appropriately modified within the technical scope of the present disclosure. Further, not limited to the above embodiments, the number, location, shape and the like of the respective structural members may be modified appropriately for actualizing the present disclosure. Here, in each drawing, the same numeral is given to the same structural element.

Although a few embodiments have been shown and described, it would be appreciated by those skilled in the art that changes may be made in these embodiments without departing from the principles and spirit of the invention, the scope of which is defined in the claims and their equivalents.

DESCRIPTION OF NUMERALS

10 Accelerator pedal apparatus
11 Housing
11a, 11b Sensor accommodating portion
12 Accelerator pedal
13 Pedal arm
13a Upper end portion
14 Return spring
15 Accelerator position sensor (APS)
20 Hysteresis generating mechanism
24 Return spring
30 Reaction force adding control mechanism
31 Torque motor
32 Return lever
33 Motor position sensor (MPS)
40 Control unit (Control board)
41 Drive circuit
42 Current detection circuit
43 Microcomputer
44 Power source circuit
45 Communication interface circuit
46 MPS input circuit
50 Engine control unit (EUC)
61 First slider
62 Second slider

What is claimed is:

1. An accelerator pedal apparatus, comprising:
an accelerator pedal;
a reaction force adding control mechanism which adds operational reaction force to operation of the accelerator pedal based on an adjustment force generation command from an upper unit; and
a hysteresis generating mechanism which provides a hysteresis pedaling force characteristic having larger pedaling force in a depression direction than that in a return direction, the hysteresis pedaling force characteristic having a hysteresis amount which is difference between the operational reaction force in a depression direction and the operational reaction force in a return direction, and the hysteresis amount being unchangeable with or without addition of the adjustment force generation command,
wherein the operational reaction force added by the reaction force adding control mechanism is not larger than the hysteresis amount generated by the hysteresis generating mechanism.

2. An accelerator pedal apparatus, comprising:
an accelerator pedal;
a hysteresis generating mechanism which provides a hysteresis pedaling force characteristic having larger pedaling force in a depression direction than that in a return direction;
a reaction force adding control mechanism which adds operational reaction force to operation of the accelerator pedal based on an adjustment force generation command from an upper unit; and
an operation detector to detects whether motion of the accelerator pedal is in the depression direction or the return direction,
wherein the operational reaction force added by the reaction force adding control mechanism is not larger than a hysteresis amount generated by the hysteresis generating mechanism,
the reaction force adding control mechanism adds the operational reaction force which is not larger than the hysteresis amount generated by the hysteresis generating mechanism in a case that the motion of the accelerator pedal is detected as being in the depression direction by the operation detector while the adjustment force generation command is provided from the upper unit, and
the reaction force adding control mechanism does not add the operational reaction force in a case that the motion of the accelerator pedal is detected as being in the return direction by the operation detector while the adjustment force generation command is provided from the upper unit.

3. The accelerator pedal apparatus according to claim 1, further comprising:
a housing adapted to be fixed to a vehicle body;
a pedal arm attached to the accelerator pedal, the pedal arm being swingably supported by the housing;
a return spring which exerts urging force to return the pedal arm toward a rest position;
an accelerator pedal position sensor (APS) to detect a rotational angle of the pedal arm due to operation of the accelerator pedal as the accelerator opening and which outputs the detected accelerator opening as an APS signal to the upper unit, the upper unit being an engine control unit (ECU); and
a control unit to generate the operational reaction force by controlling the reaction force adding control mechanism based on an adjustment force generation command input from the ECU via a controller area network (CAN) communication line.

4. The accelerator pedal apparatus according to claim 3, wherein the hysteresis generating mechanism comprises a first slider, a second slider, and a return spring which are accommodated in the housing,
wherein the first slider and the second slider are engaged with an upper end portion of the pedal arm and are detachably attachable, whereby the first slider and the second slider generate frictional force with an inner wall face of the housing owing to depressing pedaling force of the accelerator pedal.

5. The accelerator pedal apparatus according to claim 3, wherein the reaction force adding control mechanism comprises:
a torque motor having a rotation axis arranged at a position different from the swing axis of the pedal arm;
a return lever which is arranged at the rotation axis which adds the adjustment force, the return lever being contacted to the pedal arm; and
a motor position sensor.

* * * * *